United States Patent
Colledge et al.

(10) Patent No.: US 7,509,313 B2
(45) Date of Patent: Mar. 24, 2009

(54) SYSTEM AND METHOD FOR PROCESSING A QUERY

(75) Inventors: Matthew Colledge, Montreal (CA); Marc Carrier, Montreal (CA)

(73) Assignee: Idilia Inc., Montreal (CA)

( * ) Notice: Subject to any disclaimer, the term of this patent is extended or adjusted under 35 U.S.C. 154(b) by 417 days.

(21) Appl. No.: 10/921,875

(22) Filed: Aug. 20, 2004

(65) Prior Publication Data

US 2005/0080780 A1 Apr. 14, 2005

Related U.S. Application Data

(60) Provisional application No. 60/496,681, filed on Aug. 21, 2003.

(51) Int. Cl.
G06F 17/30 (2006.01)
(52) U.S. Cl. .................... 707/5; 707/3; 707/4
(58) Field of Classification Search ................ 707/3–5, 707/104.1; 704/9
See application file for complete search history.

(56) References Cited

U.S. PATENT DOCUMENTS

| 5,237,503 A | 8/1993 | Bedecarrax et al. |
| 5,317,507 A | 5/1994 | Gallant |
| 5,325,298 A | 6/1994 | Gallant |
| 5,477,451 A | 12/1995 | Brown et al. |
| 5,510,981 A | 4/1996 | Berger et al. |
| 5,519,786 A | 5/1996 | Courtney et al. |
| 5,541,836 A | 7/1996 | Church et al. |
| 5,675,819 A | 10/1997 | Schuetze |
| 5,768,603 A | 6/1998 | Brown et al. |
| 5,794,050 A | 8/1998 | Dahlgren et al. |

(Continued)

FOREIGN PATENT DOCUMENTS

EP 597630 A1 5/1994

(Continued)

OTHER PUBLICATIONS

Ben-Shaul I et al: "Adding Support for Dynamic and Focused Search with Fetuccino" Computer Netoworks, Elsevier Science Publishers B.V., Amsterdam, NL, vol. 31, No. 11-16, May 17, 1999, pp. 1653-1665 (p. 1658, left column, lines 29-37).

(Continued)

*Primary Examiner*—Don Wong
*Assistant Examiner*—Angela M Lie
(74) *Attorney, Agent, or Firm*—Santosh K. Chari; Blake, Cassels & Graydon LLP

(57) ABSTRACT

The invention provides a system and method of processing a query directed to a database. The invention comprises implementing the steps of: obtaining the query from a user; and disambiguating the query using a knowledge base to obtain a set of identifiable senses associated with words in the query. Further if the set comprises more than one identifiable sense, then the following additional steps are executed: selecting one sense from the set as a best sense; utilizing the best sense of the query to identify relevant results from the database related to the best sense; re-disambiguating the remaining senses of the set by excluding results associated with the best sense; selecting a next best sense from the remaining senses; and utilizing the next best sense of the query to identify relevant results from the database related to the next best sense. The invention also provides updates to databases for users, sessions and common data relating to the best identified results for the queries, to improve and personalize disambiguation of subsequent queries by a user.

9 Claims, 9 Drawing Sheets

U.S. PATENT DOCUMENTS

| | | | |
|---|---|---|---|
| 5,805,832 A | 9/1998 | Brown et al. | |
| 5,873,056 A * | 2/1999 | Liddy et al. | 704/9 |
| 5,907,839 A | 5/1999 | Doth | |
| 5,953,541 A | 9/1999 | King et al. | |
| 5,996,011 A | 11/1999 | Humes | |
| 6,006,221 A * | 12/1999 | Liddy et al. | 707/5 |
| 6,026,388 A | 2/2000 | Liddy et al. | |
| 6,038,560 A | 3/2000 | Wical | |
| 6,070,134 A | 5/2000 | Richardson et al. | |
| 6,076,088 A | 6/2000 | Paik et al. | |
| 6,078,878 A | 6/2000 | Dolan | |
| 6,081,775 A | 6/2000 | Dolan | |
| 6,088,692 A | 7/2000 | Driscoll | |
| 6,092,034 A * | 7/2000 | McCarley et al. | 704/2 |
| 6,098,033 A | 8/2000 | Richardson et al. | |
| 6,098,065 A | 8/2000 | Skillen et al. | |
| 6,105,023 A | 8/2000 | Callan | |
| 6,138,085 A | 10/2000 | Richardson et al. | |
| 6,253,170 B1 | 6/2001 | Dolan | |
| 6,256,629 B1 | 7/2001 | Sproat et al. | |
| 6,260,008 B1 * | 7/2001 | Sanfilippo | 704/9 |
| 6,366,908 B1 | 4/2002 | Chong et al. | |
| 6,405,162 B1 | 6/2002 | Segond et al. | |
| 6,421,675 B1 | 7/2002 | Ryan et al. | |
| 6,453,315 B1 * | 9/2002 | Weissman et al. | 707/5 |
| 6,766,320 B1 | 7/2004 | Wang et al. | |
| 6,816,857 B1 * | 11/2004 | Weissman et al. | 707/5 |
| 7,089,236 B1 * | 8/2006 | Stibel | 707/5 |
| 2002/0026456 A1 * | 2/2002 | Bradford | 707/500 |
| 2002/0147724 A1 | 10/2002 | Fries et al. | |
| 2003/0028367 A1 | 2/2003 | Chalabi | |
| 2003/0217052 A1 | 11/2003 | Rubenczyk et al. | |
| 2004/0117173 A1 * | 6/2004 | Ford et al. | 704/9 |
| 2006/0117052 A1 | 6/2006 | Bradford | |

FOREIGN PATENT DOCUMENTS

| | | |
|---|---|---|
| EP | 1061465 A2 | 12/2000 |
| EP | 1170677 A2 | 1/2002 |
| EP | 597630 B1 | 7/2002 |
| WO | WO 01/42984 A1 | 6/2001 |
| WO | WO 02/10985 A2 | 2/2002 |
| WO | WO 02/17128 A1 | 2/2002 |
| WO | WO 02/99700 A1 | 12/2002 |

OTHER PUBLICATIONS

Computational Linguistics, MIT Press, vol. 24, No. 1, Mar. 1998, pp. 1-3, 148.

* cited by examiner

Fig. 3B

Knowledge base 400

Nodes Table 402

| Id 406 | Type 408 | Annotations 410 |
|---|---|---|
| bank 406A | word 408A | |
| LABEL001 406B | Fine Sense 408B | Noun, A financial institution 410B |
| LABEL002 | Fine Sense | Noun, sloping land or shoreline |
| LABEL003 | Fine Sense | Noun, A building in which commercial banking is transacted |
| LABEL004 | Fine Sense | Verb, to do business with a bank |
| LABEL005 | Coarse Sense | |
| deposit | word | |
| LABEL006 | Fine Sense | Noun, a facility where things can be deposited for storage or safe keeping |

Edge/Relations Table 404

| From node ID 412 | To node ID 414 | type 416 | Annotations 418 |
|---|---|---|---|
| bank | LABEL001 | Word to Fine Sense | 1 |
| bank | LABEL002 | Word to Fine Sense | 2 |
| bank | LABEL003 | Word to Fine Sense | 4 |
| bank | LABEL004 | Word to Fine Sense | 3 |
| bank | LABEL 005 | Word to Coarse Sense | |
| LABEL005 | LABEL001 | Coarse to Fine Sense | |
| LABEL005 | LABEL003 | Coarse to Fine Sense | |
| LABEL005 | LABEL004 | Coarse to Fine Sense | |
| deposit | LABEL006 | Word to Fine Sense | 8 |
| LABEL006 | LABEL003 | Hyponym | |

\* Optional: could always consider confidence to be low

SYSTEM AND METHOD FOR PROCESSING A QUERY

RELATED APPLICATION

This application claims the benefit of U.S. Provisional Application No. 60/496,681 filed on Aug. 21, 2003.

FIELD OF THE INVENTION

The present invention relates to Internet searching, and more particularly to Internet searching using semantic disambiguation and expansion.

BACKGROUND

When working with large sets of data, such as a database of documents or web pages on the Internet, the volume of available data can make it difficult to find information of relevance. Various methods of searching are used in an attempt to find relevant information in such stores of information. Some of the best known systems are Internet search engines, such as Yahoo (trademark) and Google (trademark) which allow users to perform keyword-based searches. These searches typically involve matching keywords entered by the user with keywords in an index of web pages.

However, existing Internet search methods often produce results that are not particularly useful. The search may return many results, but only a few or none may be relevant to the user's query. On the other hand, the search may return only a small number of results, none of which are precisely what the user is seeking while having failed to return potentially relevant results.

One reason for some difficulties encountered in performing such searches is the ambiguity of words used in natural language. Specifically, difficulties are often encountered because one word can have several meanings. This difficulty has been addressed in the past by using a technique called word sense disambiguation, which involves changing words into word senses having specific semantic meanings. For example, the word "bank" could have the sense of "financial institution" or another definition attached to it.

U.S. Pat. No. 6,453,315 teaches meaning based information organization and retrieval. This patent teaches creating a semantic space by a lexicon of concepts and relations between concepts. Queries are mapped to meaning differentiators which represent the location of the query and the semantic space. Searching is accomplished by determining a semantic difference between differentiators to determine closeness and meaning. This system relies upon the user to refine the search based on the meanings determined by the system or alternatively to navigate through nodes found in the search results.

As known in the art, the evaluation of the efficiency of information retrieval is quantified by "precision" and "recall". Precision is quantified by dividing the number of correct results found in a search by the total number of results. Recall is quantified by dividing the number of correct results found in a search by the total number of possible correct results. Perfect (i.e. 100%) recall may be obtained simply by returning all possible results, except of course, this will give very poor precision. Most existing systems strive to balance the criteria of precision and recall. Increasing recall, for example by providing more possible results by use of synonyms, can consequentially reduce precision. On the other hand, increasing precision by narrowing the search results, for example by selecting results that match the exact sequence of words in a query, can reduce recall.

There is a need for a query processing system and method which addresses deficiencies in the prior art.

SUMMARY OF THE INVENTION

According to one aspect of the present invention, there is provided a method of searching information comprising the steps of disambiguating a query, disambiguating and indexing information according to keyword senses, searching the indexed information to find information relevant to the query using keyword senses in the query and other word senses which are semantically related to the keyword senses in the query, and returning search results which include information containing the keyword senses and other semantically related words senses.

The method may be applied to any database which is indexed using keywords. Preferably, the method is applied to a search of the Internet.

The semantic relations may be any logically or syntactically defined type of association between two words. Examples of such associations are synonymy, hyponymy etc.

The step of disambiguating the query may include assigning probability to word senses. Similarly, the step of disambiguating the information may include attaching probabilities to word senses.

The keyword senses used in the method may be coarse groupings of finer word senses.

In another aspect, a method of processing a query directed to a database is provided. The method comprising the steps of: obtaining the query from a user; and disambiguating the query using a knowledge base to obtain a set of identifiable senses (or interpretations) associated with words in the query. Further if the set comprises more than one identifiable sense (or interpretation), then the following additional steps are executed: selecting one sense (or interpretation) from the set as a best sense (or interpretation); utilizing the best sense of the query to identify relevant results from the database related to the best sense; re-disambiguating the remaining senses of the set by excluding results associated with the best sense; selecting a next best sense from the remaining senses; and utilizing the next best sense of the query to identify relevant results from the database related to the next best sense.

In the method, the step of disambiguating the query may comprise utilizing an algorithm selected from: an example disambiguation algorithm, an n-word disambiguation algorithm, and a priors disambiguation algorithm.

The method may further comprise: obtaining a selected identifiable sense from the user identifying a selected word sense from the set of identifiable senses; and updating the knowledge base with data regarding the query and the selected identifiable sense.

In the method, the data may comprise data for the user.

In the method, the data may further comprise data for a session associated with the user and the query.

In yet another aspect, a method of processing a query directed to a database is provided. The method comprises the steps of: obtaining the query from a user; and disambiguating the query using a knowledge base to obtain a set of identifiable senses associated with words in the query. If the set comprises more than one identifiable sense, then the method includes: selecting one sense from the set as a best sense; utilizing the best sense of the query to identify relevant results from the database related to the best sense; expanding the best sense to obtain related word senses for the best sense to produce an expanded best sense of the query; compare the expanded best sense of the query to an index associated with the database. Then the method includes selectively processing remaining senses of the set by: re-disambiguating the remaining senses of the set excluding results associated with the best sense; selecting a next best sense from the remaining senses; utilizing the next best sense of the query to identify relevant results from the database related to the next best sense; and identifying a term associated with the next best sense which distinguishes the next best sense from the best sense. Next, the method comprises the steps of obtaining results from the database utilizing the expanded next best sense of the query; generating a query to the user utilizing the term to test whether the next best sense was the sense meant by the user; obtaining from the user a response to the query to identify an intended sense from the displayed results; and utilizing the response to further re-disambiguate the set of senses.

In the method, the step of disambiguating the query may comprise utilizing an algorithm selected from: an example disambiguation algorithm, an n-word disambiguation algorithm, and a priors disambiguation algorithm.

In still yet another aspect, a method of processing a query directed to a database is provided. The method comprises the steps of: obtaining the query from a user; and disambiguating the query using a knowledge base to obtain a set of identifiable senses associated with words in the query. If the set comprises more than one identifiable sense, then the method further comprises the steps of: selecting one sense from the set as a best sense; and selectively processing remaining senses of the set. This re-disambiguation is conducted by: re-disambiguating the remaining senses of the set by excluding results associated with the best sense; and selecting at least a next best sense from the remaining senses to form a set of re-disambiguating remaining senses. For the best sense and each member of the set of re-disambiguating remaining senses the method further comprises the steps of: expanding its associated sense to obtain related word senses to produce an expanded sense of for its query; comparing its expanded sense to an index associated with the database; and obtaining results from the database utilizing its expanded sense. The method further comprises the steps of obtaining from the user an indication noting which result from all results returned from the database is an intended sense for the query; and utilizing the indication to further re-disambiguating the set of senses.

In another aspect, a method of revising a knowledge base associated with a query directed to a database is provided. The method comprises the steps of: disambiguating the query using the knowledge base to obtain a set of identifiable senses associated with words in the query; identifying an intended sense from the set; and updating the knowledge base with data regarding the query and the selected identifiable sense.

In the method the step of disambiguating the query comprises utilizing an algorithm selected from: an example memory disambiguation algorithm, an n-word disambiguation algorithm, and a priors disambiguation algorithm. Further, the step of updating the knowledge base involves updating a local knowledge base associated with the algorithm.

In other aspects various combinations of sets and subsets of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes):

FIG. 3B is a diagram of data structures used to represent the semantic relationships of FIG. 3A for the system of FIG. 1;

DESCRIPTION OF EMBODIMENTS

Figure 1:
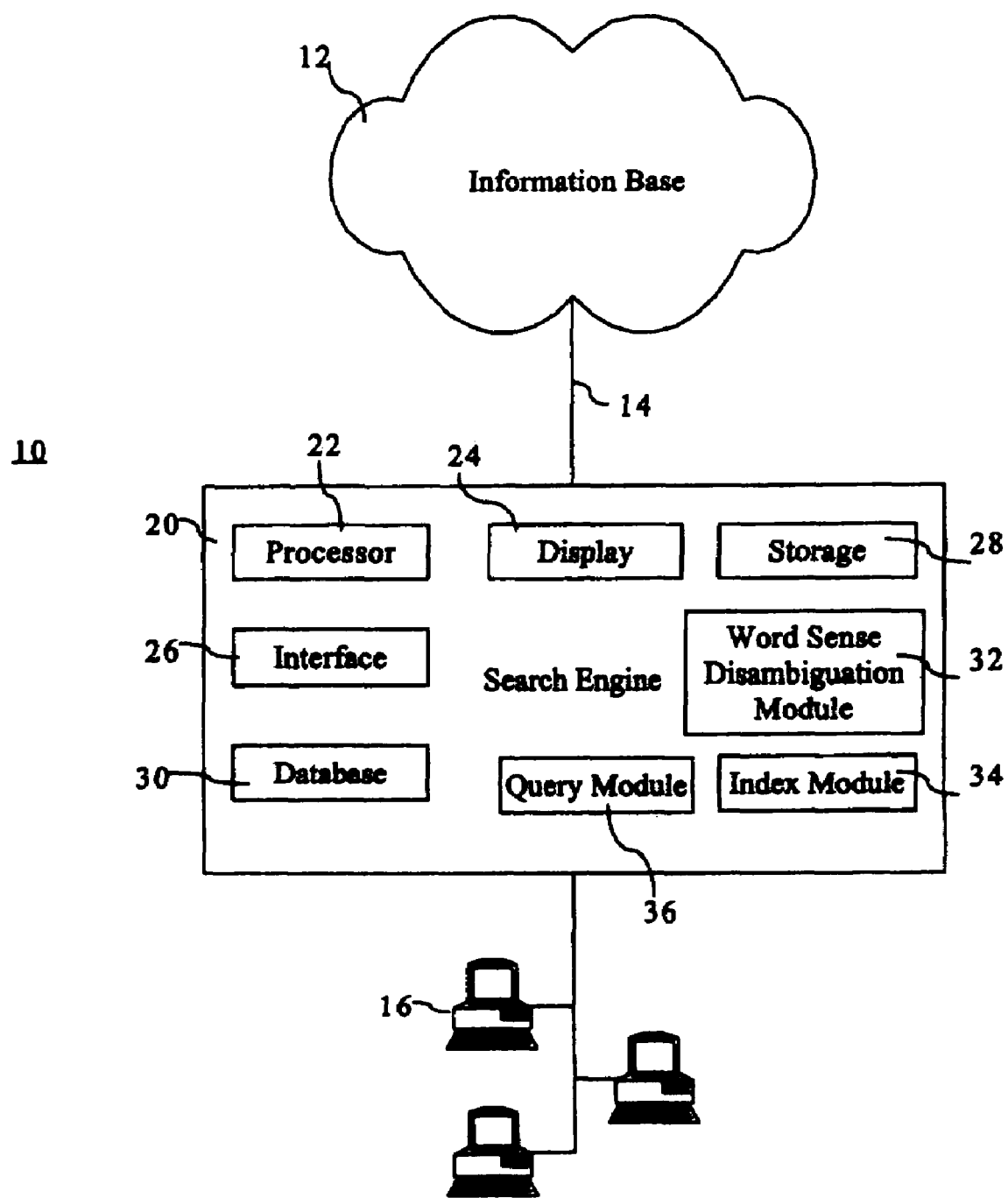
FIG. 1 is a schematic representation of an information retrieval system providing word sense disambiguation associated with an embodiment of the invention.

The description which follows, and the embodiments described therein, are provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

The following terms will be used in the following description, and have the meanings shown below:

Computer readable storage medium: hardware for storing instructions or data for a computer. For example, magnetic disks, magnetic tape, optically readable medium such as CD ROMs, and semi-conductor memory such as PCMCIA cards. In each case, the medium may take the form of a portable item such as a small disk, floppy diskette, cassette, or it may take the form of a relatively large or immobile item such as hard disk drive, solid state memory card, or RAM.

Information: documents, web pages, emails, image descriptions, transcripts, stored text etc. that contain searchable content of interest to users, for example, contents related to news articles, news group messages, web logs, etc.

Module: a software or hardware component that performs certain steps and/or processes; may be implemented in software running on a general-purpose processor.

Natural language: a formulation of words intended to be understood by a person rather than a machine or computer.

Network: an interconnected system of devices configured to communicate over a communication channel using particular protocols. This could be a local area network, a wide area network, the Internet, or the like operating over communication lines or through wireless transmissions.

Query: a list of keywords indicative of desired search results; may utilize Boolean operators (e.g. "AND", "OR"); may be expressed in natural language.

Query module: a hardware or software component to process a query.

Search engine: a hardware or software component to provide search results regarding information of interest to a user in response to a query from the user. The search results may be ranked and/or sorted by relevance.

Referring to FIG. 1, an information retrieval system associated with an embodiment is shown generally at reference 10. The system includes a store of information 12 which is accessible through a network 14. The store of information 12 may include documents, web pages, databases, and the like. Preferably, the network 14 is the Internet, and the store of information 12 comprises web pages. When the network 14 is the Internet, the protocols include TCP/IP (Transmission Control Protocol/Internet Protocol). Various clients 16 are connected to the network 14, by a wire in the case of a physical network or through a wireless transmitter and receiver. Each client 16 includes a network interface as will be understood by those skilled in the art. The network 14 provides the clients 16 with access to the content within the store of information 12. To enable the clients 16 to find particular information, documents, web pages, or the like within the store of information 12, the system 10 is configured to allow the clients 16 to search for information by submitting queries. The queries contain at least a list of keywords and may also have structure in the form of Boolean relationships such as "AND" and "OR." The queries may also be structured in natural language as a sentence or question.

The system includes a search engine 20 connected to the network 14 to receive the queries from the clients 16 to direct them to individual documents within the store of information 12. The search engine 20 may be implemented as dedicated hardware, or as software operating on a general purpose processor. The search engine operates to locate documents within the store of information 12 that are relevant to the query from the client.

The search engine 20 generally includes a processor 22. The engine may also be connected, either directly thereto, or indirectly over a network or other such communication means, to a display 24, an interface 26, and a computer readable storage medium 28. The processor 22 is coupled to the display 24 and to the interface 26, which may comprise user input devices such as a keyboard, mouse, or other suitable devices. If the display 24 is touch sensitive, then the display 24 itself can be employed as the interface 26. The computer readable storage medium 28 is coupled to the processor 22 for providing instructions to the processor 22 to instruct and/or configure processor 22 to perform steps or algorithms related to the operation of the search engine 20, as further explained below. Portions or all of the computer readable storage medium 28 may be physically located outside of the search engine 28 to accommodate, for example, very large amounts of storage. Persons skilled in the art will appreciate that various forms search engines can be used with the present invention.

Optionally, and for greater computational speed, the search engine 20 may include multiple processors operating in parallel or any other multi-processing arrangement. Such use of multiple processors may enable the search engine 20 to divide tasks among various processors. Furthermore, the multiple processors need not be physically located in the same place, but rather may be geographically separated and interconnected over a network as will be understood by those skilled in the art.

Preferably, the search engine 20 includes a database 30 for storing an index of word senses and for storing a knowledge base used by search engine 20. The database 30 stores the index in a structured format to allow computationally efficient storage and retrieval as will be understood by those skilled in the art. The database 30 may be updated by adding additional keyword senses or by referencing existing keyword senses to additional documents. The database 30 also provides a retrieval capability for determining which documents contain a particular keyword sense. The database 30 may be divided and stored in multiple locations for greater efficiency.

According to an embodiment, the search engine 20 includes a word sense disambiguation module 32 for processing words in an input document or a query into word senses. A word sense is a given interpretation ascribed to a word, in view of the context of its usage and its neighbouring words. For example, the word "book" in the sentence "Book me a flight to New York" is ambiguous, because "book" can be a noun or a verb, each with multiple potential meanings. The result of processing of the words by the disambiguation module 32 is a disambiguated document or disambiguated query comprising word senses rather than ambiguous or uninterpreted words. The input document may be any unit of information in the store of information, or one of the queries received from clients. The word sense disambiguation module 32 distinguishes between word senses for each word in the document or query. The word sense disambiguation module 32 identifies which specific meaning of the word is the intended meaning using a wide range of interlinked linguistic techniques to analyze the syntax (e.g. part of speech, grammatical relations) and semantics (e.g. logical relations) in context. It may use a knowledge base of word senses which expresses explicit semantic relationships between word senses to assist in performing the disambiguation. The knowledge base may include relationships as described below with reference to FIGS. 3A and 3B.

The search engine 20 includes an indexing module 34 for processing a disambiguated document to create the index of keyword senses and storing the index in the database 30. Index module 34 is a module which indexes data, such data from documents, for use by search engine 20. In one embodiment, index module 34 is enabled to search for documents by crawling through the web using techniques known in the art. Upon locating a document, index module provides it to disambiguation module 32 to provide a list of word senses for the content of the document. Index module 34 then indexes information regarding the word senses and the document in a database. The index includes an entry for each keyword sense relating to the documents in which it may be found. The index is preferably sorted and includes an indication of the locations of each indexed keyword sense. The index module 34 creates the index by processing the disambiguated document and adding each keyword sense to the index. Certain keywords may appear too many times to be useful and/or may contain very little semantic information, such as "a" or "the". These keywords may not be indexed.

The search engine 20 also includes a query module 36 for processing queries received from client 16. The query module 36 is configured to receive queries and transfer them to the disambiguation module 32 for processing. The query module 36 then finds results in the index that are relevant to the disambiguated query, as described further below. The results contain keyword senses semantically related to the word senses in the disambiguated query. The query module 36 provides the results to the client. The results may be ranked and/or scored for relevance to assist the client in interpreting them.

Figure 2:
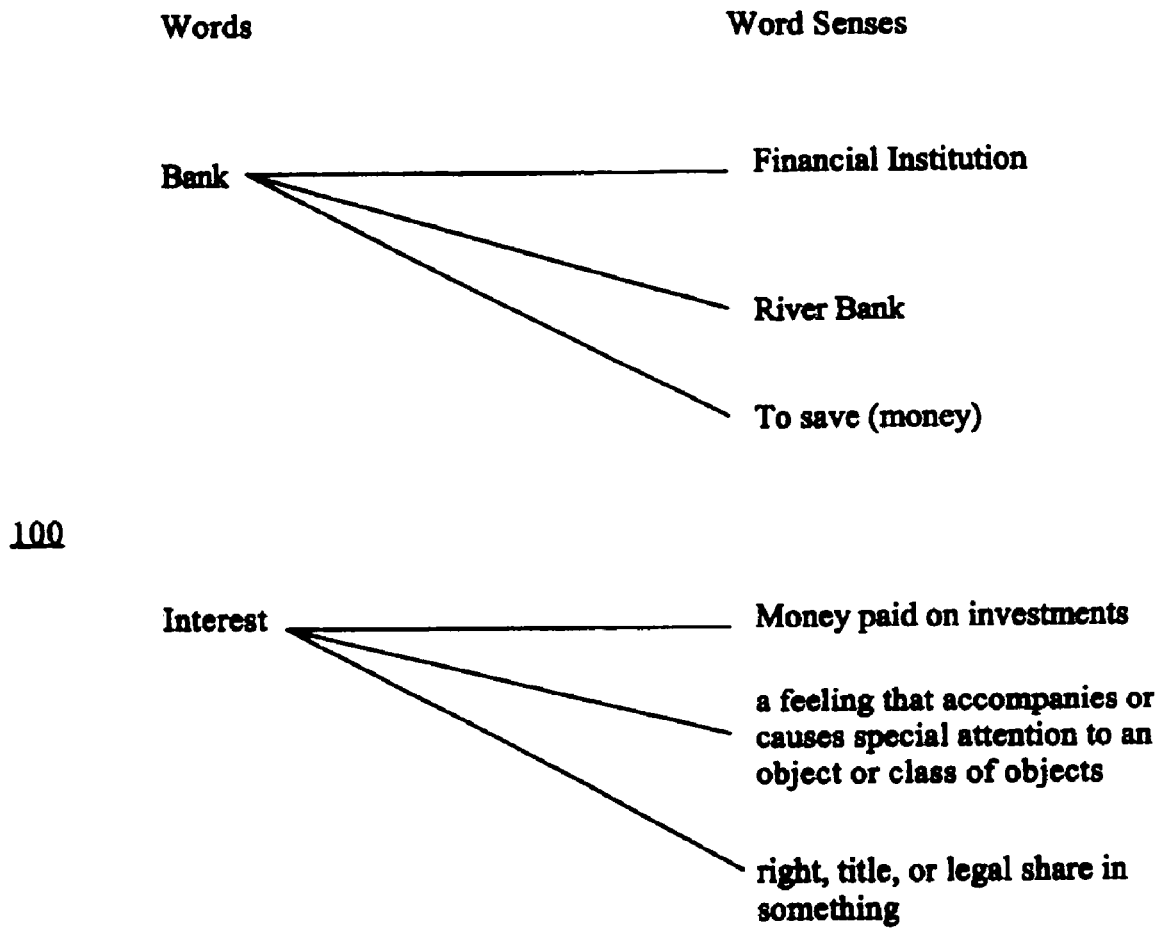
FIG. 2 is a schematic representation of words and word senses associated with the system of FIG. 1.

Referring to FIG. 2, the relationship between words and word senses is shown generally by the reference 100. As seen in this example, certain words have multiple senses. Among many other possibilities, the word "bank" may represent: (i) a noun referring to a financial institution; (ii) a noun referring to a river bank; or (iii) a verb referring to an action to save money. The word sense disambiguation module 32 splits the ambiguous word "bank" into less ambiguous word senses for storage in the index. Similarly, the word "interest" has multiple meanings including: (i) a noun representing an amount of money payable relating to an outstanding investment or loan; (ii) a noun representing special attention given to something; or (iii) a noun representing a legal right in something.

Figure 3A:
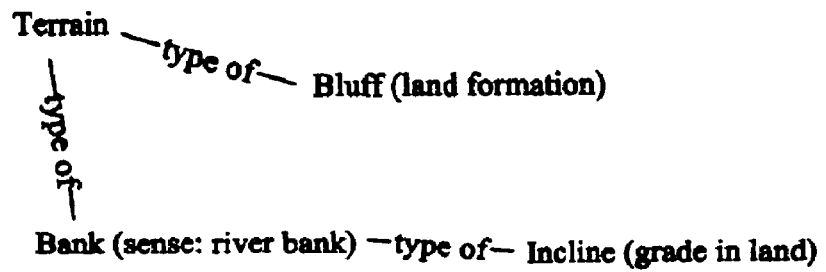
FIG. 3A is a schematic representation of a representative semantic relationship or words for with the system of FIG. 1.
Figure 3A:
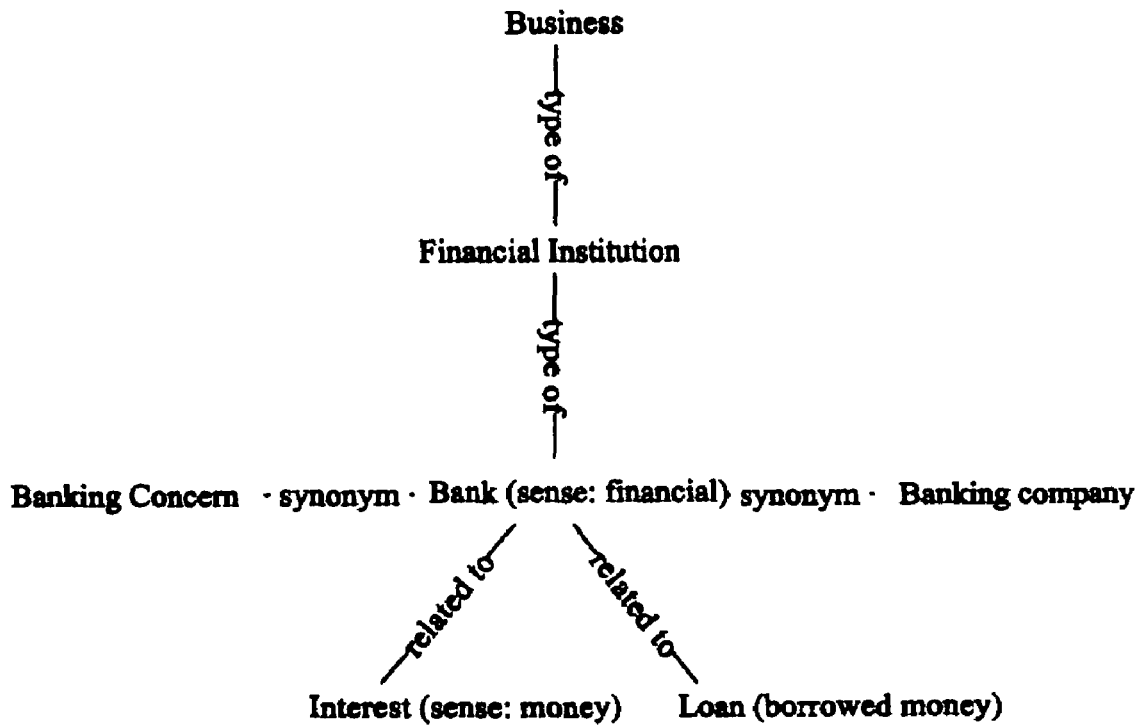

Referring to FIGS. 3A and 3B, example semantic relationships between word senses are shown. These semantic relationships are precisely defined types of associations between two words based on meaning. The relationships are between word senses, that is specific meanings of words.

Specifically in FIG. 3A, for example, a bank (in the sense of a river bank) is a type of terrain and a bluff (in the sense of a noun meaning a land formation) is also a type of terrain. A bank (in the sense of river bank) is a type of incline (in the sense of grade of the land). A bank in the sense of a financial institution is synonymous with a "banking company" or a "banking concern." A bank is also a type of financial institution, which is in turn a type of business. A bank (in the sense of financial institution) is related to interest (in the sense of money paid on investments) and is also related to a loan (in the sense of borrowed money) by the generally understood fact that banks pay interest on deposits and charge interest on loans.

It will be understood that there are many other types of semantic relationships that may be used. Although known in the art, following are some examples of semantic relationships between words: Words which are in synonymy are words which are synonyms to each other. A hypernym is a relationship where one word represents a whole class of specific instances. For example "transportation" is a hypernym for a class of words including "train", "chariot", "dogsled" and "car", as these words provide specific instances of the class. Meanwhile, a hyponym is a relationship where one word is a member of a class of instances. From the previous list, "train" is a hyponym of the class "transportation". A meronym is a relationship where one word is a constituent part of, the substance of, or a member of something. For example, for the relationship between "leg" and "knee", "knee" is a meronym to "leg", as a knee is a constituent part of a leg. Meanwhile, a holonym a relationship where one word is the whole of which a meronym names a part. From the previous example, "leg" is a holonym to "knee". Any semantic relationships that fall into these categories may be used. In addition, any known semantic relationships that indicate specific semantic and syntactic relationships between word senses may be used.

It is known that there are ambiguities in interpretation when strings of keywords are provided as queries and that having an expanded list of keywords in a query increases the number of results found in the search. The embodiment provides a system and method to identify relevant, disambiguated lists of keywords for a query. Providing such a list delineated on the sense of words reduces the amount of extraneous information that is retrieved. The embodiment expands the query language without obtaining unrelated results due to extra, related senses of a word. These related senses may include synonyms. For example, expanding the "financial institution" sense of bank will not also expand the other senses such as "river-bank" or "to save". This allows information management software to identify more precisely the information for which a client is looking.

Expanding a query involves using one or both of the following steps:

1. Adding to a disambiguated query keyword sense, any other word and its associated senses that are semantically related to the disambiguated keyword sense.
2. Paraphrasing the query by parsing its syntactic structure and transforming it into other semantically equivalent queries. The index contains fields that identify syntactic structures and semantic equivalents for words. Paraphrasing is a term and concept known in the art.

It will be recognized that the use of word sense disambiguation in a search addresses the problem of retrieval relevance. Furthermore, users often express queries as they would express language. However, since the same meaning can be described in many different ways, users encounter difficulties when they do not express a query in the same specific manner in which the relevant information was initially classified.

For example if the user is seeking information about "Java" the island, and is interested in "holidays" on Java (island), the user would not retrieve useful documents that had been categorized using the keywords "Java" and "vacation". It will be recognized that the semantic expansion feature, according to an embodiment, addresses this issue. It has been recognized that deriving precise synonyms and sub-concepts for each key term in a naturally expressed query increases the volume of relevant retrievals. If this were performed using a thesaurus without word sense disambiguation, the result could be worsened. For example, semantically expanding the word "Java" without first establishing its precise meaning would yield a massive and unwieldy result set with results potentially selected based on word senses as diverse as "Indonesia" and "computer programming". It will be recognized that the described methods of interpreting the meaning of each word and then semantically expanding that meaning returns a more comprehensive and simultaneously more target result set.

Referring to FIG. 3B, to assist in disambiguating such word senses, the embodiment utilizes knowledge base 400 of word senses capturing relationships of words as described above for FIG. 3A. Knowledge base 400 is associated with database 30 and is accessed to assist WSD module 32 in performing word sense disambiguation. Knowledge base 400 contains definitions of words for each of their word senses and also contains information on relations between pairs of word senses. These relations includes the definition of the sense and the associated part of speech (noun, verb, etc.), fine sense synonyms, antonyms, hyponyms, meronyms, pertainyms, similar adjectives relations and other relationships known in the art. While prior art electronic dictionaries and lexical databases, such as WordNet (trademark), have been used in systems, knowledge base 400 provides an enhanced inventory of words and relations. Knowledge base 400 contains: (i) additional relations between word senses, such as the grouping of fine senses into coarse senses, new types of inflectional and derivational morphological relations, and other special purpose semantic relations; (ii) large-scale corrections of errors in data obtained from published sources; and (iii) additional words, word senses, and associated relations that are not present in other prior art knowledge bases.

In the embodiment, knowledge base 400 is a generalized graph data structure and is implemented as a table of nodes 402 and a table of edge relations 404 associating two nodes together. Each is described in turn. In other embodiments, other data structures, such as linked lists, may be used to implement knowledge base 400.

In table 402, each node is an element in a row of table 402. A record for each node may have as many as the following fields: an ID field 406, a type field 408 and an annotation field 410. There are two types of entries in table 402: a word and a word sense definition. For example, the word "bank" in ID field 406A is identified as a word by the "word" entry in type field 408A. Also, exemplary table 402 provides several definitions of words. To catalog the definitions and to distinguish definition entries in table 402 from word entries, labels are used to identify definition entries. For example, entry in ID field 406B is labeled "LABEL001". A corresponding definition in type field 408B identifies the label as a "fine sense" word relationship. A corresponding entry in annotation filed 410B identifies the label as "Noun. A financial institution". As such, a "bank" can now be linked to this word sense definition. Furthermore an entry for the word "brokerage" may also be linked to this word sense definition. Alternate embodiments may use a common word with a suffix attached to it, in order to facilitate recognition of the word sense definition. For example, an alternative label could be "bank/n1", where the "/n1" suffix identifies the label as a noun (n) and the first meaning for that noun. It will be appreciated that other label variations may be used. Other identifiers to identify adjectives, adverbs and others may be used. The entry in type field 408 identifies the type associated with the word. There are several types available for a word, including: word, fine sense and coarse sense. Other types may also be provided. In the embodiment, when an instance of a word has a fine sense, that instance also has an entry in annotation field 410 to provide further particulars on that instance of the word.

Edge/Relations table 404 contains records indicating relationships between two entries in nodes table 402. Table 404 has the following entries: From node ID column 412, to node ID column 414, type column 416 and annotation column 418. Columns 412 and 414 are used to link two entries in table 402 together. Column 416 identifies the type of relation that links the two entries. A record has the ID of the origin and the destination node, the type of the relation, and may have annotations based on the type. Types of relations include "root word to word", "word to fine sense", "word to coarse sense", "coarse to fine sense", "derivation", "hyponym", "category", "pertainym", "similar", "has part". Other relations may also be tracked therein. Entries in annotation column 418 provide a (numeric) key to uniquely identify an edge type going from a word node to either a coarse node or fine node for a given part-of-speech.

Figure 4:
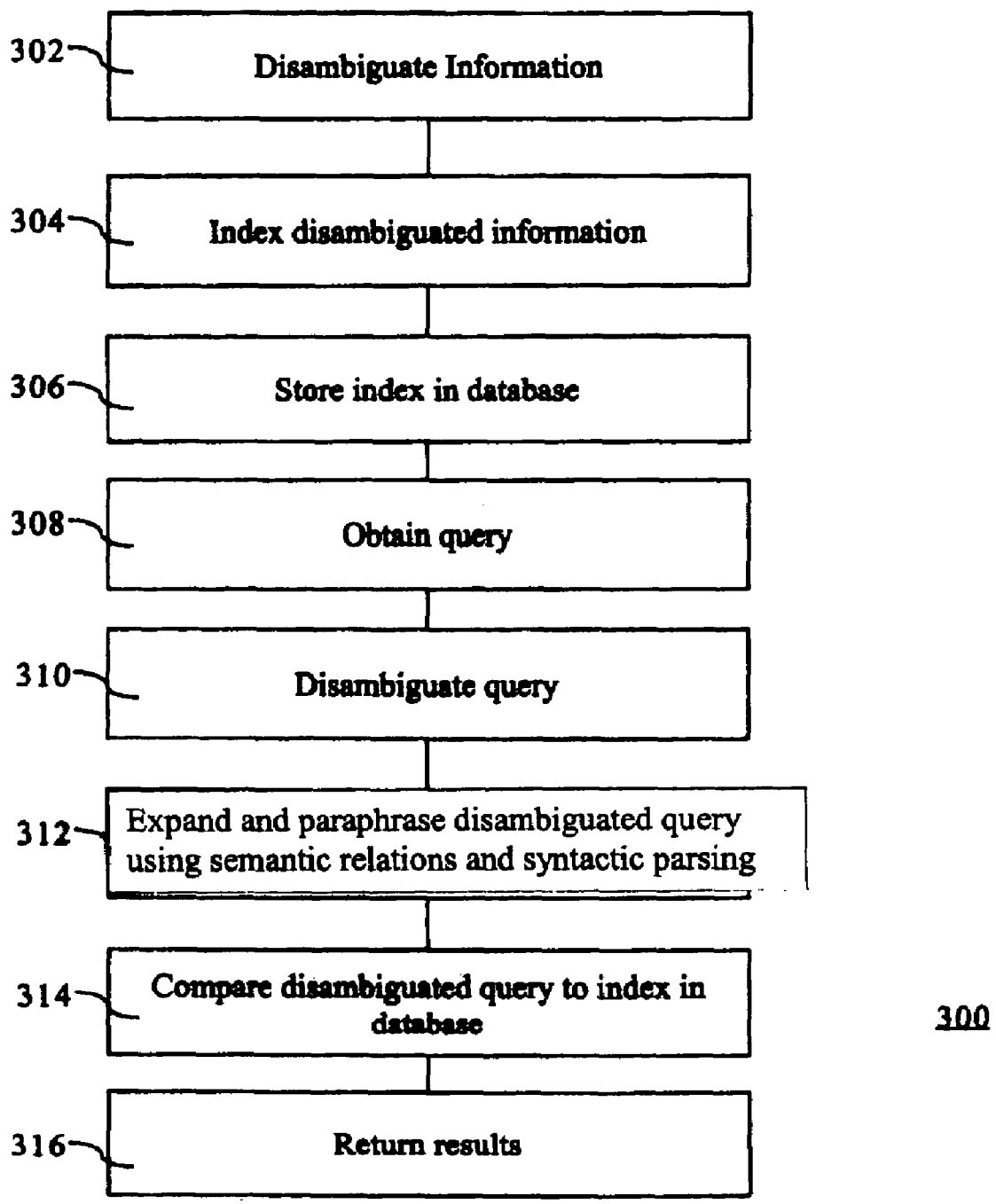
FIG. 4 is a flow diagram of a method performed by the system of FIG. 1 using the word senses of FIG. 2 and the semantic relationships of FIG. 3A.

Further detail is now provided on steps performed by the embodiment to perform a search utilizing results from disambiguating words associated with a query. Referring to FIG. 4, a process for performing such a search is shown generally by the reference 300. The process may be divided into two general stages. The first stage comprises pre-processing the information (or a subset of the information) to facilitate the second stage of responding to a query. In the first stage of pre-processing, each document in the store of information (or a subset of the store of information) is summarized to create the index in the database. At step 302, the word sense disambiguation module 32 distinguishes between word senses for each word in each document. The word sense disambiguation module 32 was defined above.

The search engine then applies the index module to the disambiguated information at step 304 to obtain an index of keyword senses. The index module 34 creates the index by processing the disambiguated document and adding each keyword sense to the index. Certain keywords may appear too many times to be useful, such as "a" or "the". Preferably, these keywords are not indexed. It will be recognized that this step effectively indexes one word as several different word senses. This index of word senses is stored in the database at step 306.

In the second stage of the process, the search engine receives a query from one of the clients at step 308. The query is parsed into its word components and then each word can be analyzed for its context alone and in context with its neighbouring words. Parsing techniques for strings of words are known in the art and are not repeated here. The word sense disambiguation module 32 distinguishes between meanings for each word in the query at step 310. To assist in disambiguation, the module may make use of results that the user has previously selected or a previously disambiguated query entered by the user, as context in addition to words in the query itself.

In the preferred embodiment, as shown at step 312, using knowledge base 400 (FIG. 3B), the search engine expands the disambiguated query to include keyword senses which are semantically related to the specific keyword senses in the query. The expansion is performed on the basis of word sense and accordingly produces a list of word senses which are related to the meaning of the query. The semantic relationships may be those described above with reference to FIGS. 3A and 3B.

The search engine then compares the disambiguated and expanded query to word sense information in the database at step 314. Entries in the knowledge base whose word senses match the keyword senses in the query are selected to be results. As noted earlier, the knowledge base includes a database of indexed documents. The search engine then returns results to the client at step 316. In one embodiment, the results may be weighted according to the semantic relationship between the word senses found in the results and that of the keywords in the query. Thus, for example, a result containing a word sense with a synonymous relationship to the keyword senses in the query may be given a higher weighting as compared to a result containing word senses with a hyponym relationship. The results may also be weighted by a probability that a keyword sense in the disambiguated query and/or disambiguated document is correct. The results may also be weighted by other features of the document or web page corresponding to the results such as the frequency of the relevant word senses or their location in relation to each other, or other techniques for ranking results as will be understood by persons skilled in the art.

It will be recognized that the first stage of the process may be performed as a pre-computation step, prior to interaction with the clients. The second stage could be performed several times without repeating the first stage. The first stage may be performed occasionally, or at regular intervals to maintain currency of the database. The database could also be updated incrementally by choosing performing the first stage on subsets of the information, such as newly added or modified information.

Generally, the embodiment also utilizes word sense disambiguation to sense tag queries. In particular, the embodiment performs the following functions to sense tag queries:
1. Identifying a likely sense of the query key words using word sense disambiguation;
2. Identifying other likely alternate interpretations of the query using word sense disambiguation;
3. Ranking each interpretation as for its likelihood as being the intended meaning;
4. Using the alternate interpretations derived using word sense disambiguation to obtain confirmation from the user of the meant meaning and correct interpretation.
5. If required, updating the intended interpretation of the query for a given user;

Details of each of the five functions are provided below.

For the first function, system 10 uses disambiguation engine 32 and the knowledge base to identify a likely word sense for a query. In order to identify plausible word senses, a number of word sense disambiguation components, but not necessarily all, are used by the embodiment to identify their senses. One component accesses a set of rules associated with the words to determine the sense of a word. The rules identify the presence of any relation between word senses of the given word and adjacent words. In the embodiment, the rules are manually coded. One example of a rule is as follows: for two words in a sentence, if the two words have a common sense in their list of possible senses, then this common sense is determined to be the likely intended meaning. An application of this rule is found in the sentence: "He sold his interest in the company which amounted to a 25% stake." Therein, the words "interest" and "stake" share a common sense of "right, title, or legal share in something" Other embodiments may use automatically coded rules.

A second process for the first function assigns senses to words by identifying any coherent topics which capture a main semantic meaning of the words. A topic is a vector of weighted senses. Coherence between topics is measured as a function of the likelihood that the senses in the topics are going to appear together in text. When multiple topics are identified in the text, each topic may be complimentary or contradictory to the other topics. Contradictory topics may indicate different possible interpretations of the query. A contradictory topic is a different vector with alternate senses of the same words also results in a comparable length vector.

For the second function, the embodiment may use or re-use a disambiguation process to identify likely alternative word senses and analyze results of each process against the other results. Some of the processes are described below. It will be appreciated that the processes and algorithms may be considered to be components of the embodiment.

A first process for the second function repeats the disambiguation process for a query but constrains the sense of a word to a sense that had not been previously reported. The disambiguation of the query then selects an alternate sense for that word and may modify the sense of the remaining words. This process may be repeated for each sense of each word to obtain a set of alternate interpretations.

Another process re-disambiguates for the second function the query using all of the set of algorithms, but constrains the algorithms to consider that one of the alternative topics be the most likely solution (to the exclusion of the previously identified most likely topic). Accordingly, when the other algorithms execute, their respective results will change. This can be systematically repeated for each identified topic to obtain a set of alternate interpretations.

Another algorithm for the second function assigns a sense from the set of known possible senses to one of the word and disambiguates the senses of the remaining words. This can be systematically repeated for each sense of each word to obtain a set of alternate interpretations.

Each of the algorithms for the second function may be used individually or in combination to generate a list of possible alternate interpretation of the query's meaning. Some of the generated interpretations may be duplicates of each other and only a single instance may be kept for further processing.

For the third function, a ranking may be attributed to each result which may be used to state an accuracy for each result. For example, a ranking may be based on the number of hits generated for each interpretation. Alternatively, a probability threshold may be set and a probability score may be assigned to the results of each process. If scores of the word senses distribution are above the threshold, then each such sense is retained. Alternatively, if the difference in scoring between the top sense and the second sense exceeds a certain delta value, then the top value is deemed to be acceptable. Also, interpretations having a deemed low probability score, because their score values are below an unacceptable threshold value, may be automatically discarded.

For the fourth function, using word sense disambiguation, two algorithms are provided to obtain confirmation from the user of the meant meaning. The first algorithm is used to derive a question to be posed by system 10 related to the query. The second algorithm is used to selectively group the results of the disambiguation. Each algorithm is discussed in turn below.

Figure 5:
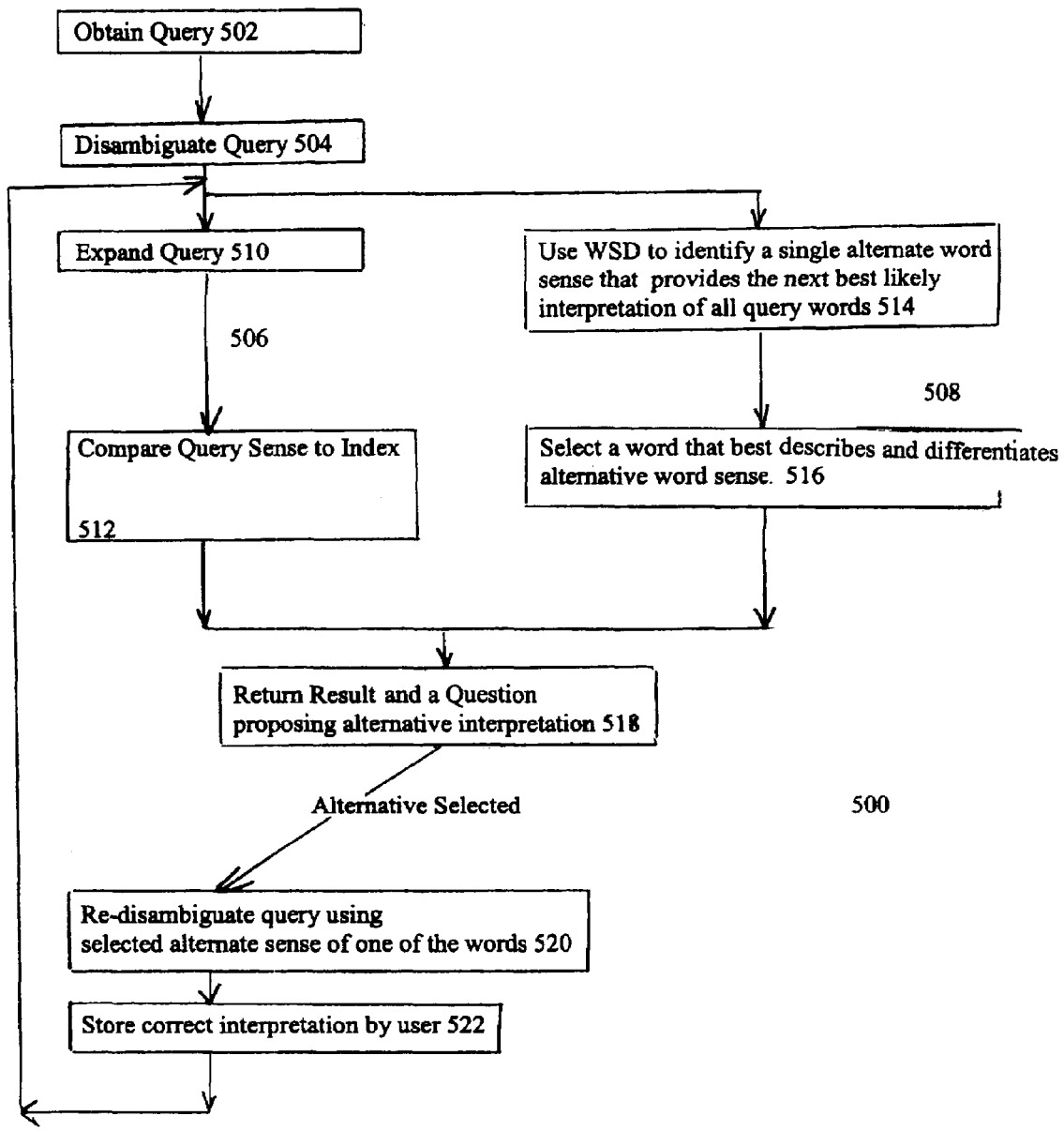
FIG. 5 is a flow diagram of a method of applying word sense disambiguation as provided by the system of FIG. 1 to query processing.

Referring to FIG. 5, algorithm 500 is shown representing the first algorithm of the fourth function. Algorithm 500 presents a user with a question asking if the intended meaning is the second likely interpretation while presenting the search results based on the first interpretation. As an example, if the original query contained only the keyword "java", the algorithm would identify a likely meaning of the word "java" relates to either Indonesia or the programming language. For the example, it is presumed that "Indonesia" is the more confident interpretation and its results are displayed. However, as an added filter, the first algorithm generates the following question for the user: "Did you mean an object-oriented programming language?" If the user answers affirmatively to the question, then the results for the second interpretation are displayed.

In order to identifying terms to use in the question, it is preferable that algorithm 500:
1. First, obtain the query (step 502)
2. Disambiguate the query to identify the most likely word senses as the first interpretation using disambiguation engine 32 (step 504);
3. After step 504, conducting, in parallel, steps in path 506 and path 508;
   A. In path 506, the following steps are performed:
      Expand the query for semantically related senses; this may utilize word sense disambiguation to find suitable semantically related senses for the identified word sense (step 510), this may use the knowledge base describing word senses and the semantic relationships between the senses;
      then compare the expanded set of query senses to an index senses found in documents; the index may be generated by index module 32 (step 512);
   B. In path 508, the following steps are performed:
      Identify the second most likely interpretation of the whole query providing alternate word senses for at least one word; this is preferably done by eliminating the effect of the first most likely word sense identified in step 504 from the possible set of results and then re-disambiguating the remaining senses amongst themselves using disambiguation engine 32 (step 514);
      From the selected second most likely interpretation, identifying words that have a different meaning between the first and second interpretation (step 516);
      Between the best and the second most likely interpretations, identify a term or association which is semantically related only to the second word sense and not related to the first sense. This distinguishes the second word sense from the first. Further, the term may form part of question phrase. In the example above, in the knowledge base, "Java" has a "type-of" association with the phrase "object-oriented programming language" and "Java" has an alternate "part-of" association with "Indonesia"

and and". As such the "type-of" association distinguishes the first and second senses for "Java" (step 518);
4. Return results and generate a question based on the keyword or association identified for the second most likely interpretation. Algorithm 500 preferably uses the first interpretation as being the intended meaning unless the user selects the question. If the question is selected, the display search results can be updated to the second interpretation and the intended meaning can be also updated (step 520);
5. If the second most likely interpretation was selected, then re-disambiguate the query, using the senses associated with the second most likely interpretation to recompute the word sense probability distribution with the new input that confirms the intended meaning of the second most likely interpretation using disambiguation engine 32 (step 522); and
6. Store the results of the interpretation selected by the user for the query and update the knowledge base accordingly (step 524); and return to the beginning of paths 506 and 508.

In algorithm 500, in step 516 the descriptive term of the second word sense is identified by analyzing each semantic relation to other word senses of all of the senses of the query word. If the descriptive term has semantic relations appearing in more than one sense of the query word, then the descriptive term is discarded, as it does not differentiate the senses of the query word. Thereafter, the remaining semantically related word senses are ranked for their descriptive and differentiating attributes. These attributes include: their type of semantic relation, the frequency of their word senses, their parts-of-speech, the number of other semantically related word senses, and others.

It will be appreciated that algorithm 500 provides three levels of refinement to search queries. The first level is a first unconstrained pass at disambiguation to identify a first interpretation in step 504. The second level is to identify a second most likely interpretation, by constraining it to ignore the first answer. It will be appreciated that the results of the second level may still be ambiguous. As the first interpretation is effectively ignored for the second level by constraining the second level to consider only alternative senses, re-disambiguation at this point can better find the next best interpretation as the effects of the first interpretation from the set of word senses are eliminated. The third level is activated only when the user selects the question in step 520. In this level, as the user has provided feedback as to the intended meaning of the query (either directly via answering a question or indirectly by not answering a question), the meaning of the word in the query is no longer ambiguous. Its sense is now known with a high degree of certainty. Thereafter the further re-disambiguation in step 522 is based on the second most likely interpretation only, ignoring any additional interpretations which were located in step 514. For example, a query with the word "Java" may have been interpreted as an island in Indonesia in the first level of disambiguation. When the query is re-disambiguated and constrained to ignore that sense, the disambiguation engine may determine that an object-oriented programming language was the second best interpretation of that word. However, "java" could still refer to "coffee". Accordingly, in the last disambiguation, the meaning of "java" is confirmed to be an object-oriented language and its constraints can be updated to indicate that "java" in this context is neither the island nor coffee.

In an alternative embodiment to algorithm 500, a decision point (not shown) may be inserted immediately after step 504. At the decision point, the results of step 504 are analyzed and if there is confidence in the results, then path 506 is taken for processing results of step 504. If there is insufficient confidence in the results, then paths 506 and 508 is taken.

Figure 6:
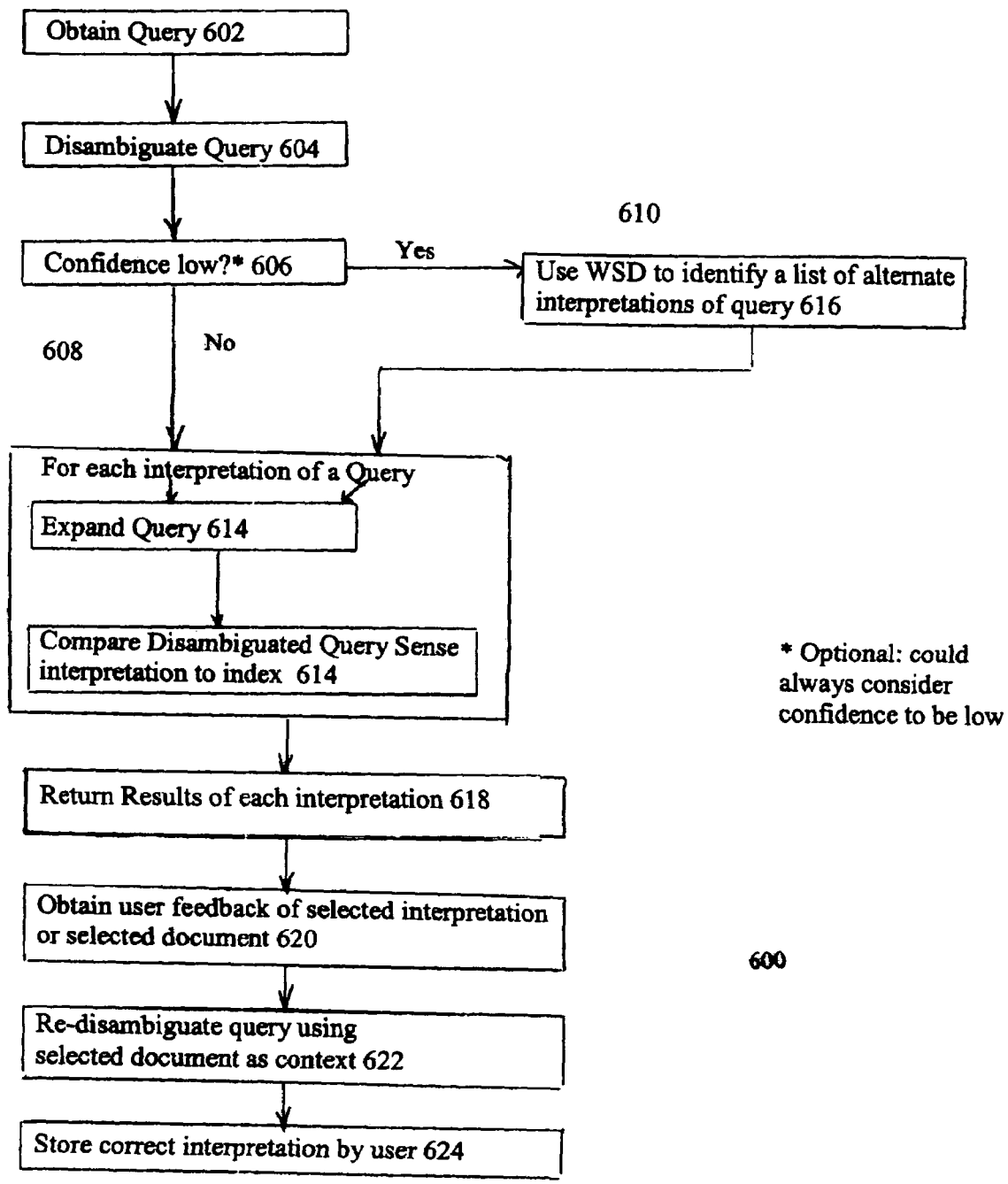
FIG. 6 is a flow diagram of another method of applying word sense disambiguation as provided by the system of FIG. 1 to query processing.

Referring to FIG. 6, algorithm 600 is shown representing the second algorithm of the fourth function. Algorithm 600 presents a user with result for two or more interpretations of a query and monitors which result the user selects to view to determine the intended meaning of the query. Algorithm 600 determines the intended meaning of a query via two methods:
1. In the first method, a most likely and at least one alternative interpretation of the query word are generated. However, the algorithm simply selects the most likely interpretation as being the correct interpretation. Only the most likely interpretation is selected if the ranking score is above a certain threshold. Subsequently, the sense tagging of each query keyword is confirmed accordingly.
2. In the second method, again a most likely and at least one alternative interpretation of the query word are generated. When the user selects a document associated with one of the interpretations, the algorithm re-disambiguating the query using the selected document as context. This method allows the senses of each word to be confirm or corrected based on the content of the document. The document may provide additional context that allows other ambiguous query words in the alternate interpretation to be disambiguated with higher confidence.

Briefly, notable steps of algorithm 600 are as follows:
1. First, obtain the query (step 602, similar to step 502)
2. Disambiguate the query using disambiguation module 32 (step 604, similar to step 504);
3. Determine rankings for the results. In one alternative, the ranking value threshold for the ranking is set to a low value threshold (step 606);
4. If the threshold is met, then path 608 is taken. If the threshold is not met, then path 610 is taken.
   A. In path 608, the following functions are performed for each interpretation of a query:
      Expand the query using word sense disambiguation using disambiguation engine 32 (step 612, similar to step 510); then
      Compare the query sense to the index (step 614, similar to step 512);
   B. In path 610, the following function is performed prior to steps 612 and 614:
      Use word sense disambiguation to identify a list of alternative interpretations of the query. The list is generated by first ignoring results associated with the highest ranked results (step 616, similar to step 514);
5. After step 614, return results of each interpretation and wait for input (step 618);
6. Obtain user feedback on the selected interpretation or selected document (step 620)
7. Re-disambiguate the query using the selected document as context, by ignoring other word senses (step 622, similar to step 520); and
8. Store the results of the interpretation selected by the user for the query (step 624).

For algorithm 600, various methods can be used to present to a user the different groups of results. Three exemplary methods are described. A first method utilizes clearly clustering results into separate groups of alternate interpretations. A word or description of each interpretation can optionally be included with each group using methods described earlier to identify descriptive and differentiating words semantically related to each interpretation. A second method displays results for the first interpretation with a link for each of the other remaining interpretation allowing the user to view the associated results. A third method merges results from each interpretation into a single list of results. The user is not aware that multiple interpretation of the query are displayed but upon his selection of a result, the intended meaning can be identified as described above.

Another aspect of the embodiment enables disambiguation of a query to be personalized for each user and across each user session. This is preferably done in step 522 of algorithm 500 and step 624 in algorithm 600. Personalization of the word sense disambiguation enables the embodiment to assign different word senses to the same or related queries for different users. Personalization and customization of word sense disambiguation improves the quality of the search results obtained from the improved query senses due to automatic acquisition and use of the personalized information. It can readily be seen that personalization can enhance customer loyalty to a particular search engine service provider, because of the improved search results provided to each customer.

Figure 8:
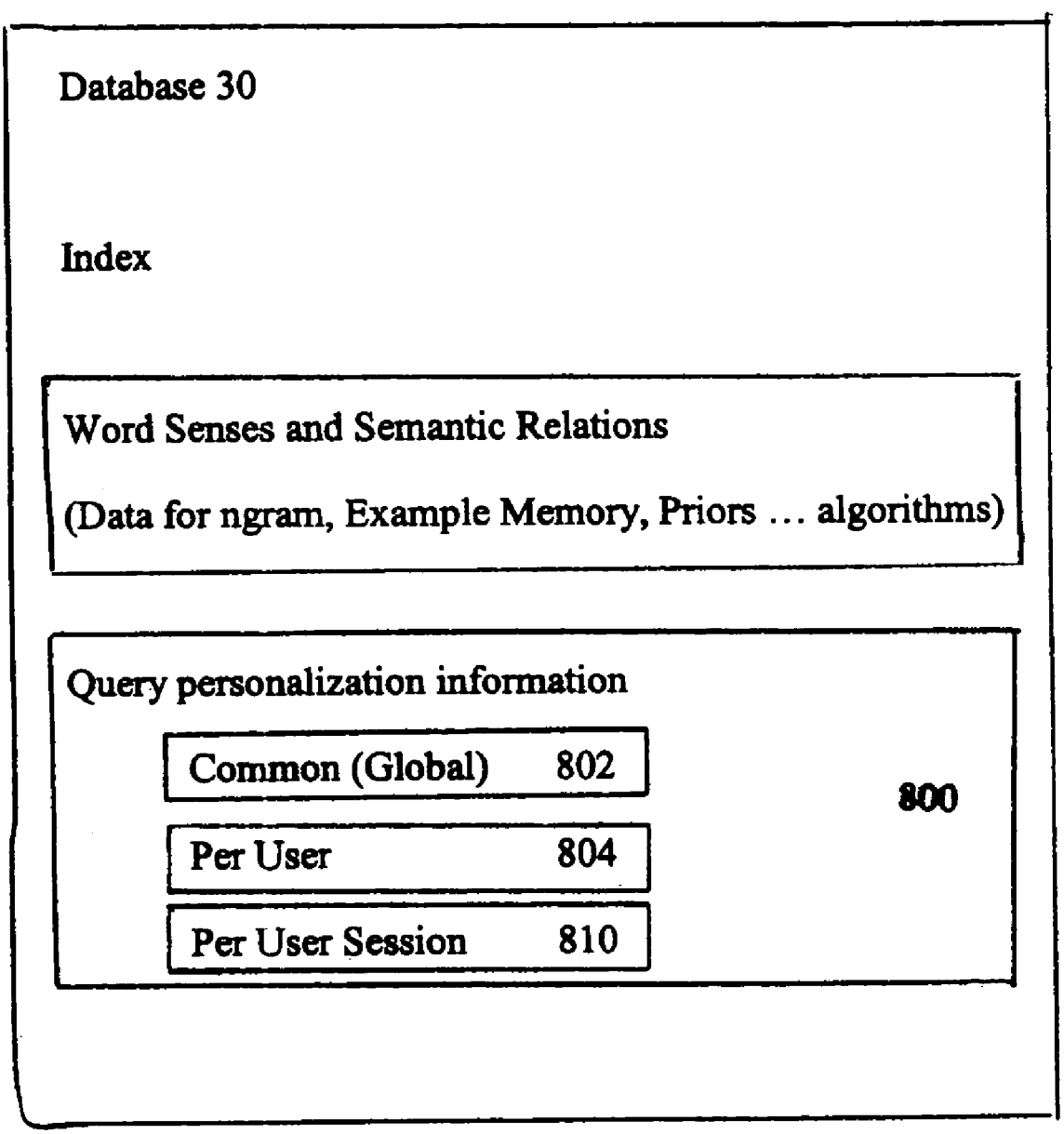
FIG 8. is a schematic representation of a database containing personalization information.

Referring to FIG. 8, personalization of queries requires tracking of information in database 30. This information is tracked in query personalization database 800 in database 30. Data for database 800 is derived from tagged senses identified when the embodiment disambiguates a query.

It will be appreciated that for a user of a search engine, there are at least three types of temporal relationships with him and the search engine. The user is defined as a person that uses a search engine. When the user accesses the search engine in a session having a period of interactivity with a search engine with a clear beginning and end, this period is defined as a session. The session may be for a defined period of time. During the session, he may be looking for a few specific topics, e.g. vacation sites. The collective searches of all of the user's sessions define his user data. All of the user data of all of the users of the search engine define the common data for the search engine.

To track user, session and common information, query personalization database 800 is partitioned into three sets of data: a set of common data 802 relating to word sense tags used by all users; a set of per user data 804; and a set of per user session data 806. Other sets of data may also be tracked.

Data in database 800 is updated at sufficient intervals for each type of data with sense tagged queries or information transformed from the related queries. For example, per user session data 806 may be updated after each query; per user data 804 may be updated at the beginning or end of each session of a user; and common data 802 may updated at periodic time intervals. A user can be identified to the embodiment by installing and evaluating cookies installed on his machine. It will be appreciated that if a user activates several sessions, separate cookies can be provided on his machine to identify each session.

Common data 802 may be in stored in a consolidated common partition of query personalization database 800. Per user data 804 and per user session data 806 may be stored in a partition of query personalization database 800 that exists for each user. The sense tagged queries and derived information may be stored in a temporary partition that exists in the system's memory for each user session. Preferably, there is a file for the common data, for each user, and for each user session. Part of the data in these files is loaded into system memory as need when disambiguating a query.

When disambiguating a query for a given user in a specific user session, the additional information from query personalization database 800 may be used by other components simultaneously. This can cause those components to generate different results under different circumstances. The common, per user, and per user session information derived from the sense tagged queries is used as input to the components in addition to the core disambiguation database. It will be appreciated that different data may affect different queries. Data associated with a session may only affect queries associated with that session. Data associated with one user may only affect queries associated with that user. Common data may affect any user.

Figure 7:
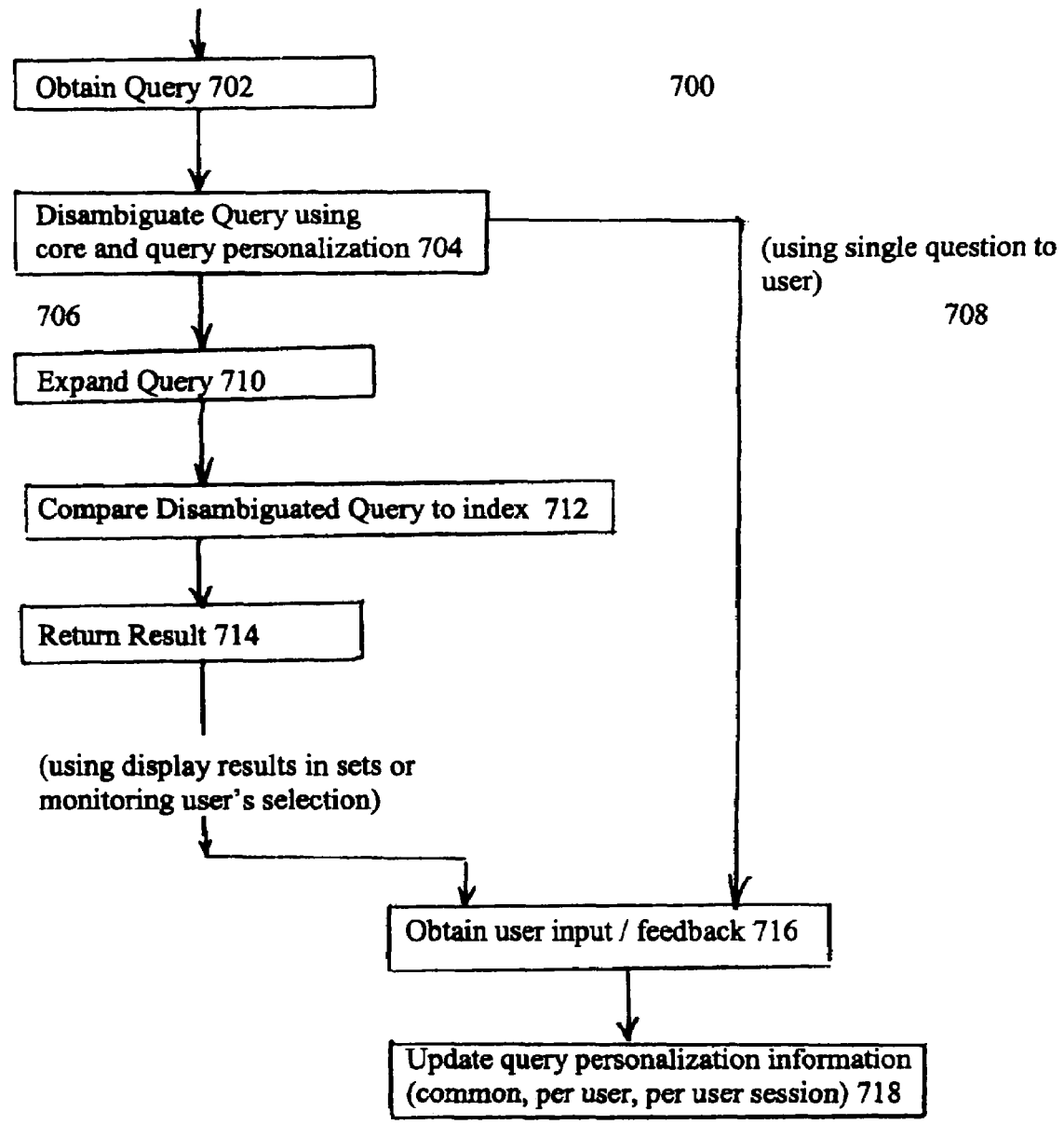
FIG. 7 is a flow diagram of a method of applying personalization as provided by the system of FIG. 1 to query processing.

Referring to FIG. 7, algorithm 700 is shown which identifies notable steps of personalization of data. In particular for algorithm 700, its steps are as follows:

1. First, obtain the query (step 702)
2. Disambiguate the query using personalization data (step 704);
3. After step 704, conducting in parallel steps along path 706 and path 708;
    A. In path 706, the following steps are performed:
        Expand the query for semantically related senses to find suitable semantically related senses for the identified word utilizing the knowledge base (step 710);
        Compare the expanded set of query senses to an index of the senses found in disambiguated documents (step 712);
        Return results of the query (step 714);
        Go to step obtain user input/feedback (in step 716);
    B. In path 708, simply step 716 is done next;
4. Upon completion of paths 706 and 708, obtain user feedback on the selected interpretation or selected document (step 716); and
5. Update query personalization data (step 718).

For algorithm 700, for steps 716 and 718, conducting personalization of data involves: acquiring and storing of personalized data relating to a query; and using data to improve word sense disambiguation of queries. Each requirement is discussed in turn.

For acquiring and storing data, it is already assumed that a system exists for sense tagging initial queries of a user. A validated sense tagged query has a word sense assigned to each of the query keywords. It is preferable that the system has vetted the word senses such that there is high confidence that the word sense represent the intended meaning of the word.

As a user submits a query to a search engine, the sense tagged query as well as other information derived from it is stored in query personalization database 800. Information derived from the sense tagged queries is stored in a file for disambiguation algorithms of disambiguation engine 32. The disambiguation algorithms include: a priors algorithm; an example memory algorithm; an n-gram algorithm; a dependencies algorithm and a classifier algorithm. Details of each algorithm are described below. Other algorithms may also be used.

The priors algorithm predicts word senses by utilizing historical statistical data on frequency of appearances of various word senses. Specifically the algorithm assigns a probability to each word sense based on the frequency the word sense in the input sense tagged text. Therein, senses in the input sense tagged text are counted and the frequency distribution of the senses for each word are preferably normalized. Note the input sense tagged text is not the text being disambiguated but is text that has previously been disambiguated and where the confidence that the intended meaning has been correctly identified is very high.

For optimization and performance issues, the priors algorithm computes a frequency count for each sense from the sense tagged text and stores the frequency data as a file in database 800. The core database contains the frequency counts obtained from sense tagged text while the personalization database 800 holds the word sense frequency counts of sense tagged queries. Also, a consolidated file exists containing the frequency count of word senses of sense tagged queries from all users. A separate file exists in database 800 for each user containing the word sense frequency count of sense tagged queries associated with that user. These files represent the user, user session and common data represent the query personalized data. After the files are updated, on the next execution of the priors algorithm, the senses derived from the last execution of the algorithm become available for the knowledge base.

Finally, the system maintains a frequency count of the sense tagged queries of a specific user's session either in memory or on a hard disk. Preferably, this data is not used when disambiguating a query with personalization information.

Therein, senses in the sense tagged query are counted and the frequency distribution of the senses for each word are preferably normalized. The set of queries used can be all queries from all users, all queries from one user, or the queries from one user session. The system updates the frequency count as each query is processed or at appropriate intervals. The normalization of the frequency distribution may be performed on a word-by-word basis when disambiguating that word in a new query or text.

The example memory algorithm predicts words senses for phrases (or word sequences). Phrases typically are defined as a series of consecutive words. A phrase can be two words long up to a full sentence. The algorithm accesses a list of phrases (word sequences) which provide a deemed correct sense for each word in that phrase. Preferably, the list comprises sentence fragments from input sense tagged text that occurred multiple times where the senses for each of the fragment occurrence was identical. Preferably, when an analyzed phrase contains a word which has a sense which differs from a sense previously attributed to that word in that phrase, senses in the analyzed phrase are rejected and are not retained in the list of word sequences.

When disambiguating a new text or query, the example memory algorithm identifies whether parts of the text or query match the previously identified recurring sequences of words. If there is a match, the module assigns the word senses of the sequence to the matching words in the new text or query. Preferably, the algorithm initially searches for the longest match and does not assign the word senses if a word sense contradicts with senses that have already been identified in the text or query. When analyzing a query, the algorithm searches for matches of sentence fragments from the query being processed to fragments in its associated list. When a match is located, it is assigned the sense from the list to the fragment being processed. The algorithm maintains several lists to assist in its processing, including: a list of word sequences with correct senses that were derived from training input sense tagged text; a list derived from sense tagged queries from all users; a list derived from all queries of a user; and a list derived from the queries of a user's session.

For optimization and performance issues, the example memory algorithm stores data regarding identification of recurring sequences of word senses and frequency of that pattern as separate data in a file. This is done instead of processing the input sense tagged text each time the embodiment disambiguates new text. The example memory algorithm also stores a file containing information derived from the senses tagged queries. There is also a file for the common data; a file for each user; and a file for each user session. These files represent the user, user session and common data represent the query personalized data. Part of the data in these files is loaded into the system memory as need when processing the disambiguation of a query. When the files are updated, on the next execution of the priors algorithm, the senses derived from the last execution of the algorithm become available for the knowledge base.

The n-grams algorithm predicts a sense of a single word by looking for recurring patterns of words or word senses in words around the single word. While generically, the algorithm looks n number of words before or following the single word, typically, n is set at two words. The algorithm utilizes a list of word pairs with a correct sense associated with each word. This list is derived from word pairs from input sense tagged text that occurred multiple times, where the senses for each of the word pair occurrence was identical. However, when a sense of at least one word differs, such word pair senses are rejected and are not retained in the list. When disambiguating text, the algorithm matches word pairs from the query or text being processed with word pair present in the list maintained by the algorithm. A match is identified when a word pair is found and the sense of one of the two word is already present in the query or text being processed. When a match is identified, it is assigned the sense relating to the second word in the word pair being processed. N-gram maintains several lists, including: a list of word pairs with correct senses that it derived from training input sense tagged text, a list derived from sense tagged queries from all users, a list derived from all queries of a user, and a list derived from the queries of a user's session.

The n-gram algorithm differs from the example memory algorithm as it operates over a fixed range of words and only attempts to predict a sense of a single word once at a time. The example memory algorithm attempts to predict word senses of all the words in a sequence.

For optimization and performance issues, the n-gram algorithm stores data in a separate file information regarding recurring pattern of surrounding words or word senses and the frequency of that pattern which it has derived from input sense tagged text. This is done instead of processing the input sense tagged text each time the embodiment disambiguates new text. In addition to the file in the core database, the n-gram algorithm stores into system memory: a file of information derived from the senses tagged queries; a file for the common data; a file for each user; and a file for each user session. These files represent the user, user session and common data represent the query personalized data. Part of the data in these files is loaded into the system memory as need when processing the disambiguation of a query. Information in the user and user session files is updated when each new sense tagged query from a user becomes available. When the files are updated, on the next execution of the priors algorithm, the senses derived from the last execution of the algorithm become available for the knowledge base.

The dependencies algorithm is similar to the n-gram algorithm, but it generates a syntactic parse tree(e.g. adjective modifies noun, first noun modifies second noun in a noun phrase, etc.). It operates on associations between the head and the modifier in the parse tree.

The classifier algorithm predicts a sense of words by regrouping into topics possible senses for the words in a text segment. The senses with the strongest overlap (i.e., that can be best clustered) are deemed the most likely senses for the set of words in the segment. The overlap can be measured in terms of several different features (e.g., coarse senses, fine senses, etc.) The scope of the document text can vary from a few words to several sentences or paragraphs. The classifier algorithm uses words and word senses in previous queries of the user's session as additional context to personalize the disambiguation of the current query. The word senses of the previous queries are added to the set of possible topics.

Turning back to the process of using personalization data to improve word sense disambiguation of queries, when disambiguating a query, each disambiguation engine 32 component makes use of the core database and any available information in query personalization database 800. Each component can be configured to access the core database and the query personalization database 800 both independently and collectively in distinct steps during the word sense disambiguation process.

Although the invention has been described with reference to certain specific embodiments, various modifications thereof will be apparent to those skilled in the art without departing from the scope of the invention as outlined in the claims appended hereto. A person skilled in the art would have sufficient knowledge of at least one or more of the following disciplines: computer programming, machine learning and computational linguistics.

We claim:

1. A method of processing a query directed to a database, said method comprising the steps of:
   obtaining said query from a user;
   disambiguating said query using a knowledge base to obtain a set of identifiable interpretations associated with words in said query;
   selecting one interpretation from said set of interpretations as a best interpretation based on a likelihood of intended meaning;
   identifying relevant results from said database based on said best interpretation;
   expanding said best interpretation to obtain related word meanings for said best interpretation to produce an expanded best interpretation of said query;
   comparing said expanded best interpretation of said query to an index associated with said database;
   selectively processing remaining interpretations of said set of interpretations by:
      re-disambiguating said query by excluding results associated with said best interpretation;
      selecting as a next best interpretation a best interpretation from said remaining interpretations;
      identifying relevant results from said database related to said next best interpretation; and
      identifying a term associated with said next best interpretation which distinguishes said next best interpretation from said best interpretation;
   obtaining results from said database based on said expanded best interpretation of said query;
   generating a question to said user based on said term to test whether said next best interpretation was the interpretation meant by said user;
   obtaining from said user a response to said question to identify an intended interpretation; and
   further disambiguating said query based on said user response.

2. The method of processing a query directed to a database as claimed in claim 1, wherein said step of disambiguating said query comprises utilizing an algorithm selected from: an example memory algorithm, an n-word disambiguation algorithm, a priors disambiguation algorithm, a classifier algorithm and a dependencies algorithm.

3. A method of processing a query directed to a database, said method comprising the steps of:
   obtaining said query from a user;
   disambiguating said query using a knowledge base to obtain a set of identifiable interpretations associated with words in said query;
   selecting one interpretation from said set as a best interpretation based on a likelihood of intended meaning;
   selectively processing remaining interpretations of said set of interpretations by:
      re-disambiguating said query by excluding results associated with said best interpretation; and
      selecting at least a next best interpretation from said remaining interpretations to form set of re-disambiguated remaining interpretations;
   for said best interpretation and each member of said second set of re-disambiguated remaining interpretations:
      expanding and paraphrasing its associated interpretation to obtain semantically related interpretations to produce an expanded interpretation of the query;
      comparing the expanded interpretation of the query to an index associated with said database; and
      obtaining results from said database based on said expanded interpretation;
   obtaining from said user an indication of which result from all results returned from said database corresponds to the intended interpretation of said query; and
   further disambiguating said query based on said indication.

4. The method of claim 1 further comprising updating said knowledge base with data regarding the user identified intended interpretation.

5. The method of claim 3 further comprising updating said knowledge base with data regarding the user identified intended interpretation.

6. A method of processing a query directed to a database, said method comprising the steps of:
   obtaining said query from a user;
   disambiguating said query using a knowledge base to obtain a set of meanings for words in said query and to obtain a set of interpretations of said query, each of said interpretations comprising a collection of word meanings;
   ranking said set of interpretations based on a likelihood of intended meaning, wherein the highest ranked interpretation comprises a best interpretation;
   identifying relevant results from said database based on said best interpretation;
   expanding said best interpretation to obtain related word meanings for said best interpretation to produce an expanded best interpretation of said query;
   comparing said expanded best interpretation of said query to an index associated with said database;
   selectively processing remaining interpretations of said set of interpretations by:
      re-disambiguating said query by excluding results associated with said best interpretation;
      selecting as a next best interpretation a best interpretation from said remaining interpretations;
      identifying relevant results from said database based on said next best interpretation; and
      identifying a term associated with said next best interpretation which distinguishes said next best interpretation from said best interpretation;
   obtaining results from said database based on said expanded best interpretation of said query;

generating a question to said user based on said term to test whether said next best interpretation was the interpretation meant by said user;

obtaining from said user a response to said question to identify an intended interpretation; and further disambiguating said query based on said user response.

7. A method of processing a query directed to a database, said method comprising the steps of:

obtaining said query from a user;

disambiguating said query using a knowledge base to obtain a set of meanings for words in said query and to obtain a first set of interpretations of said query, each of said interpretations comprising a collection of word meanings;

ranking said set of interpretations based on a likelihood of intended meaning, wherein the highest ranked interpretation comprises a best interpretation;

selectively processing remaining interpretations of said set of interpretations by:

re-disambiguating said query by excluding results associated with said best interpretation; and selecting at least a next best interpretation from said remaining interpretations to form a second set of interpretations;

for said best interpretation and each member of said second set of interpretations:

expanding and paraphrasing its associated meaning to obtain semantically related meanings to produce an expanded interpretation of the query;

comparing the expanded interpretation of the query to an index associated with said database; and obtaining results from said database based on said expanded interpretation;

obtaining from said user an indication of which result from all results returned from said database is an intended interpretation of said query; and further re-disambiguating said query based on said indication.

8. A system for processing a query directed to a database, said system comprising:

an input means operable to receive said query from a user;

an output means operable to provide results responsive to the query;

a database comprising a store of encoded information and a knowledge base;

a processor operable to:

disambiguate said query using said knowledge base to obtain a set of interpretations of said query, each of said interpretations comprising a collection of related word meanings of words in the query;

select one interpretation from said set of interpretations as a best interpretation based on a likelihood of intended meaning;

identify relevant results from said database based on said best interpretation;

expand said best interpretation to obtain related word meanings for said best interpretation to produce an expanded best interpretation of said query;

compare said expanded best interpretation of said query to an index associated with said database;

selectively process remaining interpretations of said set of interpretations by:

re-disambiguating said query by excluding results associated with said best interpretation;

selecting as a next best interpretation a best interpretation from said remaining interpretations;

identifying relevant results from said database related to said next best interpretation; and identifying a term associated with said next best interpretation which distinguishes said next best interpretation from said best interpretation;

obtain results from said database based on said expanded best interpretation of said query;

generate a question to said user based on said term to test whether said next best interpretation was the interpretation meant by said user;

obtain from said user a response to said question to identify an intended interpretation; and to further disambiguate said query based on said user response.

9. A system for processing a query directed to a database, said system comprising:

an input means operable to receive said query from a user;

an output means operable to provide results responsive to the query;

a database comprising a store of encoded information and a knowledge base;

a processor operable to:

disambiguate said query using said knowledge base to obtain a set of interpretations of said query, each of said interpretations comprising a collection of related word meanings of words in the query;

select one interpretation from said set of interpretations as a best interpretation based on a likelihood of intended meaning;

selectively process remaining interpretations of said set of interpretations by:

re-disambiguating said query by excluding results associated with said best interpretation; and, selecting at least a next best interpretation from said remaining interpretations to form set of re-disambiguated remaining interpretations;

for said best interpretation and each member of said second set of re- disambiguated remaining interpretations:

expand and paraphrase its associated interpretation to obtain semantically related interpretations to produce an expanded interpretation of the query;

compare the expanded interpretation of the query to an index associated with said database; and obtain results from said database based on said expanded interpretation;

obtain from said user an indication of which result from all results returned from said database corresponds to the intended interpretation of said query; and to further disambiguate said query based on said indication.

* * * * *